United States Patent
Dahm

(10) Patent No.: US 9,097,183 B2
(45) Date of Patent: Aug. 4, 2015

(54) RAYLEIGH-TAYLOR ASSISTED COMBUSTION AND COMBUSTORS ADAPTED TO EXPLOIT RAYLEIGH-TAYLOR INSTABILITY FOR INCREASING COMBUSTION RATES THEREIN

(75) Inventor: Werner J. A. Dahm, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 1251 days.

(21) Appl. No.: 12/879,552

(22) Filed: Sep. 10, 2010

(65) Prior Publication Data

US 2011/0167789 A1 Jul. 14, 2011

Related U.S. Application Data

(60) Provisional application No. 61/241,323, filed on Sep. 10, 2009.

(51) Int. Cl.
| | |
|---|---|
| *F02C 7/22* | (2006.01) |
| *F02K 7/10* | (2006.01) |
| *F02C 1/00* | (2006.01) |
| *F02K 9/66* | (2006.01) |
| *F23R 3/40* | (2006.01) |
| *F02C 3/14* | (2006.01) |
| *F02C 3/16* | (2006.01) |
| *F02C 5/04* | (2006.01) |

(52) U.S. Cl.
CPC ... *F02C 7/22* (2013.01); *F02C 3/14* (2013.01); *F02C 3/165* (2013.01); *F02C 5/04* (2013.01); *F02K 9/66* (2013.01); *F23R 3/40* (2013.01); *F02K 7/10* (2013.01)

(58) Field of Classification Search
CPC ............... F02K 7/10; F02K 9/66; F23R 3/40; F02C 3/14; F02C 3/165; F02C 5/04; F02C 7/22

USPC ............ 60/39.43, 39.45, 224, 225, 726, 729, 60/767, 769, 39.822, 723, 777
See application file for complete search history.

(56) References Cited

U.S. PATENT DOCUMENTS 3,407,604 A * 10/1968 Keith et al. ............. 60/217
4,197,700 A 4/1980 Jahnig
(Continued)

FOREIGN PATENT DOCUMENTS

| BE | 874560 | 7/1979 |
| CH | 646492 A5 | 11/1984 |
| WO | 9220961 | 11/1992 |

OTHER PUBLICATIONS

Sitzki et al, "Combustion in Microscale Heat-Recirculating Burners," The Third Asia-Pacific conference on Combustion, Jun. 24-27, 2001, Seoul, Korea.*

*Primary Examiner* — Ehud Gartenberg
*Assistant Examiner* — Arun Goyal
(74) *Attorney, Agent, or Firm* — Howard & Howard Attorneys PLLC

(57) ABSTRACT

A method for improving interpenetration, mixing, and combustion between a fuel and oxidizer reactant mixture and combustion product gases in engines having a combustor includes the step of providing an engine having a combustor in which the reaction mixture and product gases are subjected to acceleration directed transverse to a direction along which the reactant mixture flows through the combustor during combustion. One or more catalyst elements are positioned within the combustor to generate Rayleigh-Taylor instability and thereby enhance interpenetration of the reactant mixture and product gases within the combustor chamber during combustion.

14 Claims, 8 Drawing Sheets

(56) References Cited

U.S. PATENT DOCUMENTS

| | | | |
|---|---|---|---|
| 6,877,978 B2 * | 4/2005 | Sirignano et al. | 431/4 |
| 7,685,824 B2 * | 3/2010 | Dahm | 60/767 |
| 2004/0226299 A1 | 11/2004 | Drnevich | |
| 2005/0126755 A1 | 6/2005 | Berry et al. | |
| 2005/0271500 A1 | 12/2005 | Lawlor et al. | |
| 2006/0021353 A1 | 2/2006 | Lawlor et al. | |
| 2007/0056290 A1 | 3/2007 | Dahm | |
| 2007/0237693 A1 | 10/2007 | Burd et al. | |

* cited by examiner

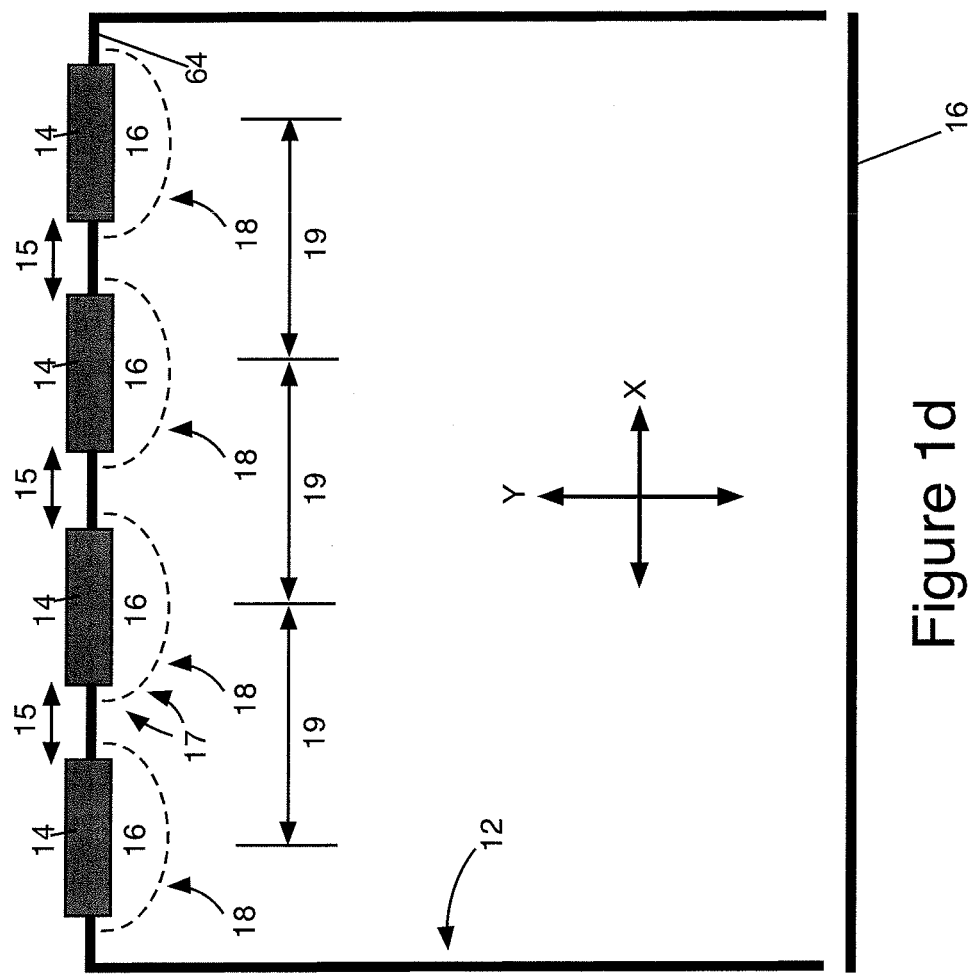

RAYLEIGH-TAYLOR ASSISTED COMBUSTION AND COMBUSTORS ADAPTED TO EXPLOIT RAYLEIGH-TAYLOR INSTABILITY FOR INCREASING COMBUSTION RATES THEREIN

CROSS-REFERENCE TO RELATED APPLICATIONS

This application claims the benefit of U.S. Provisional Application No. 61/241,323, filed Sep. 10, 2009.

BACKGROUND OF THE INVENTION

1. Field of the Invention

The instant invention generally relates to engines having a combustor in which a fuel and oxidizer reactant mixture is continually mixed with product gases to obtain stable combustion, and to methodologies for achieving improved combustion stability and increased combustion efficiency in such engines. More specifically, the invention relates to methodologies for improving interpenetration of reactant mixtures and product gases within combustors and thereby obtaining improved combustor performance.

2. Description of the Related Art

In traditional gas turbine engines, a compressor first compresses air, which then mixes with a fuel like jet fuel, kerosene, natural gas or propane to produce a reactant mixture. The reactant mixture burns in a combustor to produce combustion product gases. The heat that comes from the burning reactant mixture expands the combustion product gases. As these hot product gases flow at high speed through a bladed turbine, a torque is produced on a turbine shaft. The torque is used to drive the compressor and possibly one or more external implements like a generator.

In contrast to a traditional gas turbine engine, a traditional ramjet engine has no moving parts, and in particular has no compressor or turbine. As known in the art, the traditional ramjet engine instead achieves compression of intake air by the ram pressure that develops in a diffuser from the relative difference in velocity between the engine and the intake air. The diffuser leads to a combustor and compressed air from the diffuser mixes and burns with fuel in the combustor to produce product gases in a similar manner as the traditional gas turbine engines.

However, conventional ramjet engines can only be used when the forward speed of the engine is sufficiently high relative to the surrounding air to produce suitable ram pressure in the diffuser which is needed for acceptable performance. To overcome this limitation of conventional ramjet engines, rotary ramjet engines have been proposed. The rotary ramjet engines configure helical-shaped compression-combustion-expansion channels, which provide the ramjet flow path, in a rotor. The rotor rotates about a central axis to achieve the high relative velocity needed for effective ram compression. One known example of a rotary ramjet engine includes the helical-shaped channels formed by an appropriately shaped radially outward surface of an inner supersonic rotating rotor that faces toward a radially inward surface of an outer stationary stator. Another known example of a rotary ramjet engine is a so-called "inside-out" rotary ramjet engine, which includes a stationary stator having a generally annular, radially outward surface centered about a central axis. A rotor is rotatably supported about the central axis and is concentrically axially aligned with the radially outward surface of the stator. The rotor includes a helically extending ramjet flow channel formed therein. The flow channel in the rotor is disposed radially outwardly of the radially outward surface of the stator such that the rotor orbits about the central axis positioned on the radially outward surface during operation of the engine.

Traditional gas turbine engines, conventional ramjet engines, rotary ramjet engines, and other engines that operate on the internal combustion principle have one or more combustors in which reactant mixtures are continually interpenetrated with product gases. The fuel and compressed air entering the combustor are often referred to as reactants. Often the initially separated fuel and compressed air are mixed together to form the reactant mixture prior to combustion in the combustor. During operation of such engines, combustion is commenced in the combustors, and the flow of the reactants into the combustors and the mixing of the reactants with combustion products generally maintains continual combustion in each combustor. There is a general desire to be able to flow as much of the reactant mixture as possible into a combustor of a given volume while maintaining stable combustion and maximizing the combustion efficiency, or to minimize the volume of a combustor while maintaining stable combustion and maximizing combustion efficiency for a given flow rate of reactants.

Additionally, because continuous combustion is sought within the combustors, hot combustion product gases are also present in the combustors along with the reactant mixture. Interpenetration and associated mixing between the hot product gases and the reactant mixture within each combustor is important to maintain continual combustion in the combustor. Although the product gases are no longer combustible, it is important for the product gases to be present in the combustor, and it is important to interpenetrate the product gases and the reactant mixture within the combustor for purposes of maintaining continuous combustion in the combustor. Achieving proper interpenetration and associated mixing between the product gases and the reactant mixture within the combustor is an important consideration for effective combustor design.

Rate of interpenetration achieved between the product gases and the reactant mixture is another factor that is typically important in combustor design, since the rate of heat release due to combustion is in part determined by the rate of interpenetration. For example, if the rate of interpenetration is too slow in comparison with the rate at which the reactant mixture enters the combustor, then the rate of heat release may not be sufficient to maintain continuous, stable combustion within the combustor. This can cause combustion to cease, often referred to as "flameout".

Another factor that is typically important in combustor design is that the interpenetration should distribute the hot product gases throughout most of the combustor, so that the amount of the reactant mixture flowing through the combustor that is burned before the reactant mixture exits from the combustor is maximized. This is typically important for maximizing combustion efficiency.

As such, there is a strong desire to achieve effective interpenetration and associated mixing of the hot product gases with the incoming reactant mixture to avoid flameout and maximize combustion efficiency. Various efforts have been made in the past to alleviate conditions that result in flameout within the combustors and to thereby stabilize combustion within the combustors. For traditional gas turbine engines and conventional ramjet engines, many such efforts focus on aerodynamic stabilization through geometric design of the diffuser and combustor to control the flow pattern of the reactant mixture and the product gases within the combustor. In effect, aerodynamic stabilization designs the internal geometry of the combustor and various parts within it so that inertia of the reactant mixture entering the combustor provides for interpenetration of the reactant mixture and product gases within the combustor. However, even in common engines such as traditional gas turbines, such aerodynamic stabilization methods can only ensure continuous combustion over a limited range of reactant mixture flow rates and relative fuel-to-air mass ratios than would be desirable. It is therefore desirable to pursue other methods for effectively interpenetrating reactant mixtures and product gases and achieving continuous combustion in addition or as an alternative to methods based on traditional aerodynamic flame stabilization.

Moreover, in some types of engines, such as the rotary ramjet engines as described above, aerodynamic stabilization methods may be generally insufficient for stabilizing combustion to avoid flameout over a useful range of design or operating conditions. In particular, in rotary ramjet engines the reactant mixtures and product gases in the combustors may be subjected to large accelerations as a consequence of the rotating nature of the combustors, and thereby become subjected to large forces that can affect the flow and resulting interpenetration pattern of the reactant mixture and product gases within the combustor. Notably, the density of the hot product gases is substantially lower than that of the reactant mixture entering the combustor. Due to rotation in the rotary ramjet engines, the resulting centrifugal forces that can arise within the reactant mixture and product gases can inhibit adequate interpenetration needed to maintain stable combustion. As a consequence, rotary ramjet engines especially are in need of additional methods beyond aerodynamic stabilization to maintain the continuous combustion therein over a broad range of design and/or operating conditions.

SUMMARY OF THE INVENTION AND ADVANTAGES

A method for improving interpenetration, mixing, and combustion between a fuel and oxidizer reactant mixture and combustion product gases in engines having a combustor is provided herein. The method comprises the step of providing an engine having a combustor in which the reaction mixture and product gases are subjected to acceleration directed transverse to a direction along which the reactant mixture flows through the combustor during combustion. One or more catalyst elements are positioned within the combustor to generate Rayleigh-Taylor instability and thereby enhance interpenetration of the reactant mixture and product gases within the combustor chamber during combustion. An engine having the combustor, and one or more catalyst elements positioned within the combustor as set forth above, is also provided herein.

BRIEF DESCRIPTION OF THE DRAWINGS

These and other features and advantages of the present invention will become more readily appreciated as the same becomes better understood by reference to the following detailed description when considered in connection with the accompanying drawings, wherein:

FIG. 1d is a functional schematic view of the combustor of FIG. 1a when viewed along a streamwise direction Z along which the reactant mixture flows through the combustor, showing lateral center-to-center spacing s of a typical arrangement of catalyst elements, and a product gas region generated catalytically in the immediate proximity of each catalyst element;

DETAILED DESCRIPTION OF THE PREFERRED EMBODIMENT

Figure 1A:
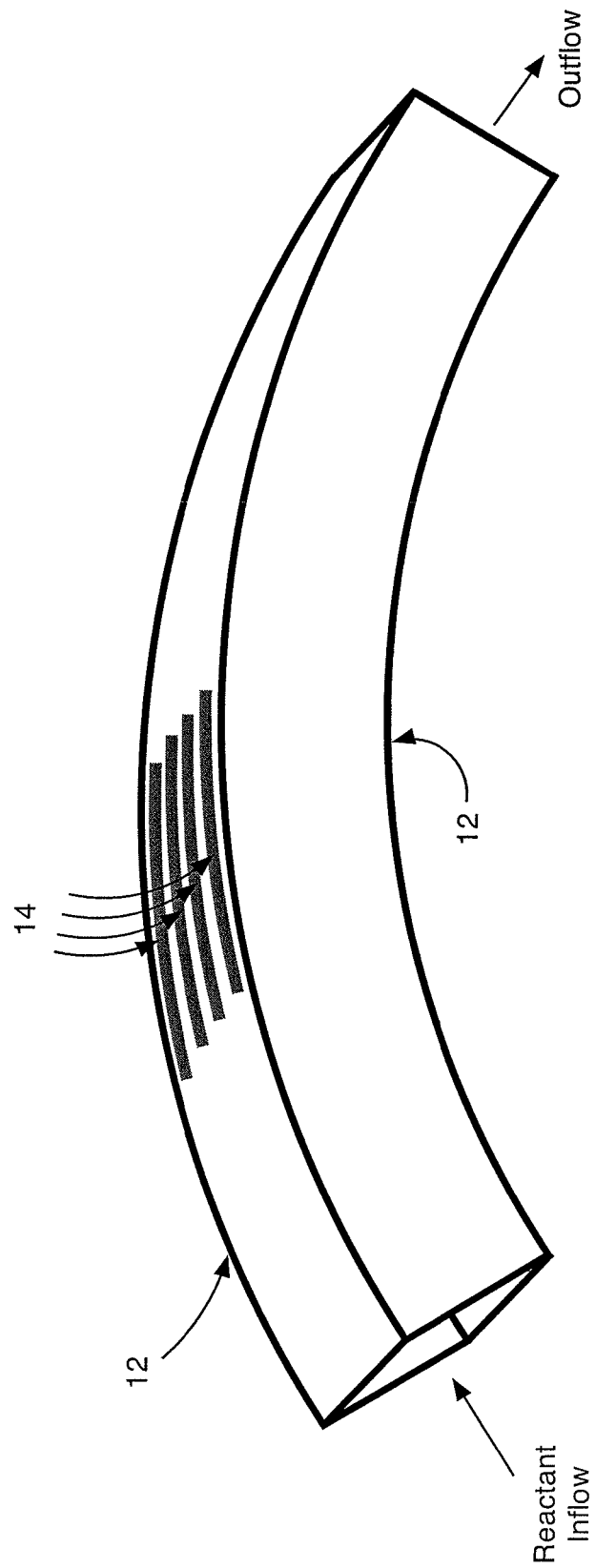
FIG. 1a is an isometric functional schematic view of a combustor, showing generally strip-like catalyst elements aligned along the streamwise direction Z and located on a radially outermost inner surface of the combustor.
Figure 1B:
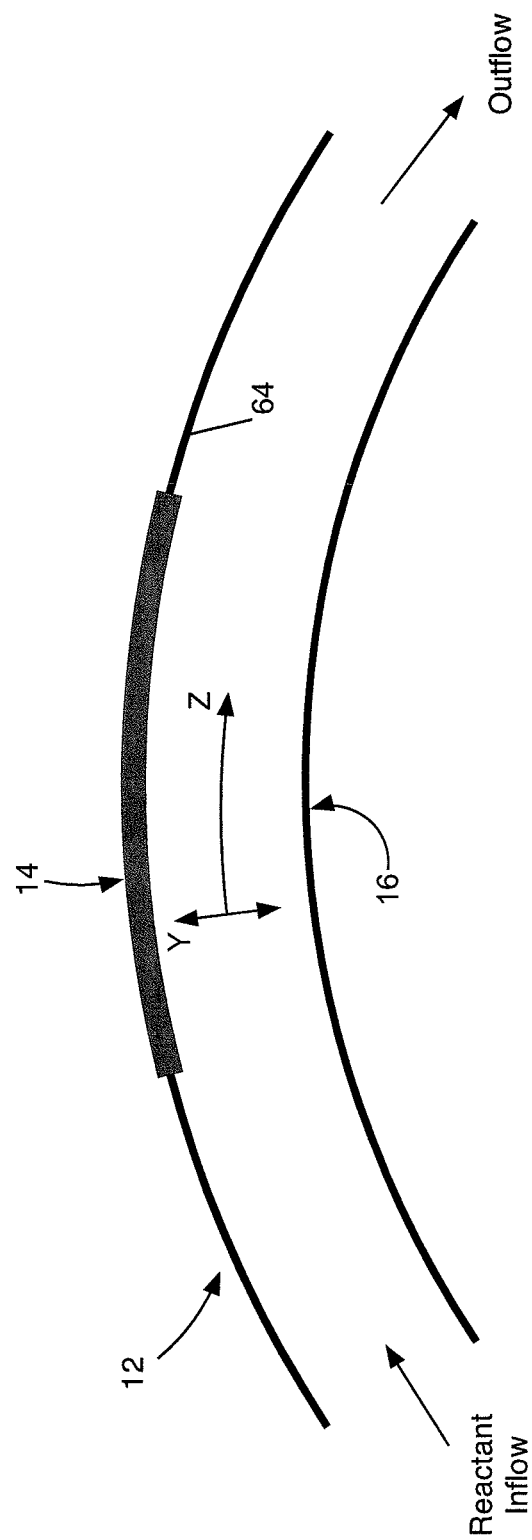
FIG. 1b is a functional schematic view of the combustor of FIG. 1a when viewed along a lateral direction X relative to the radially outermost inner surface of the combustor, showing generally strip-like catalyst elements aligned along the streamwise direction Z and located on the radially outermost inner surface of the combustor.
Figure 1C:
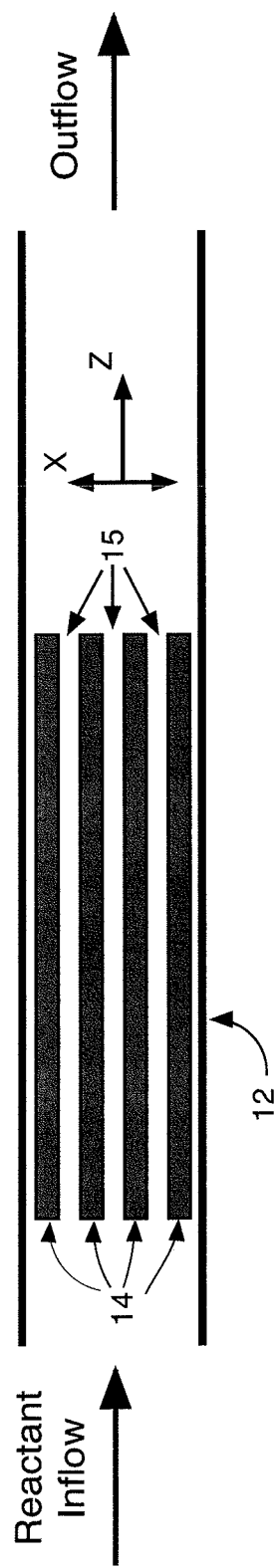
FIG. 1c is a functional schematic view of the combustor of FIG. 1a when viewed along a transverse direction Y relative to the combustor wall, showing a typical arrangement of the catalyst elements.
Figure 1E:
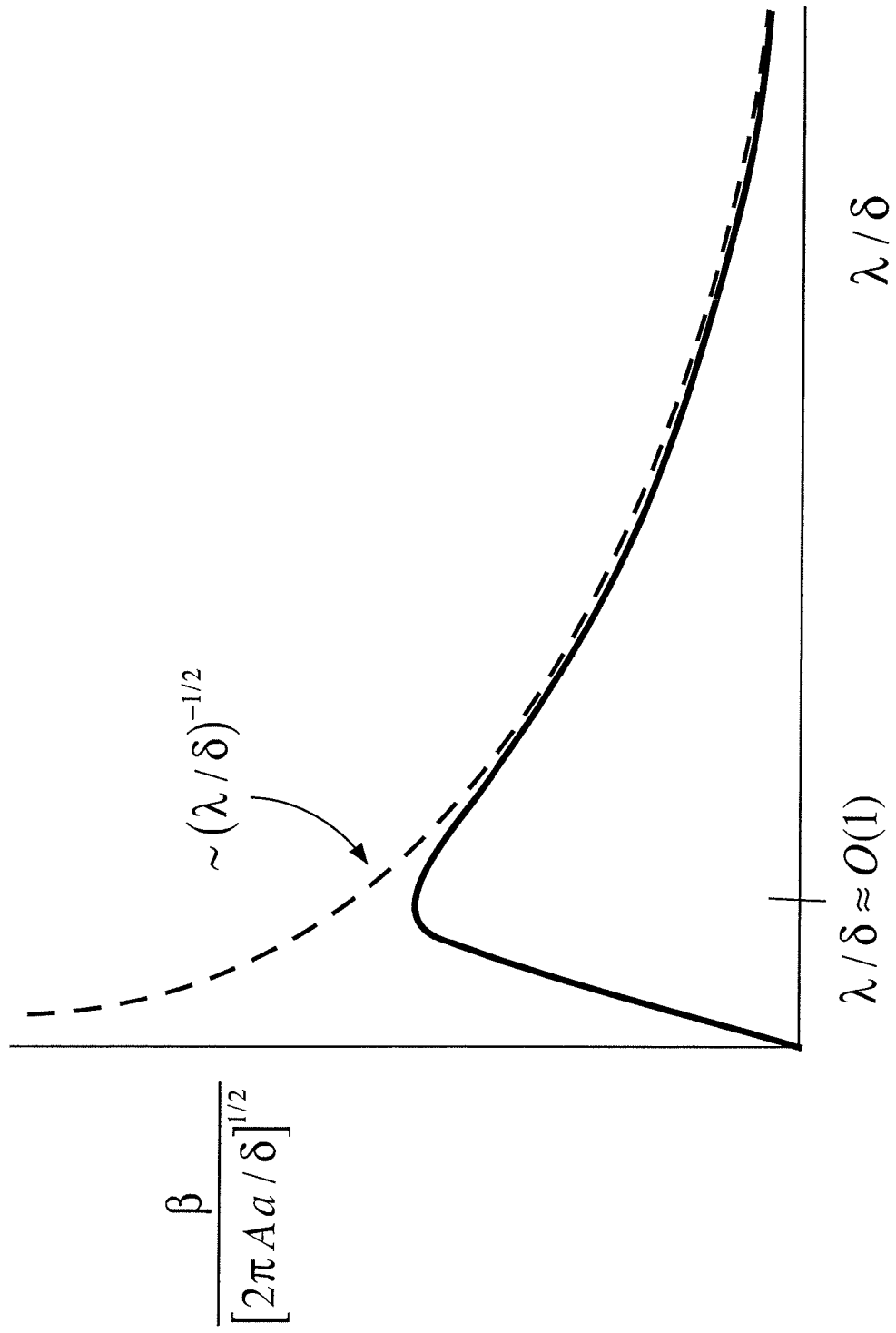
FIG. 1e is a schematic showing the typical dependence of Rayleigh-Taylor amplification rate $\beta$ on the wavelength $\lambda$ for any given density difference ratio between a reactant mixture and product gases and transverse acceleration of the reactant mixture and product gases.

A method is provided herein for improving interpenetration, mixing, and combustion between a fuel and oxidizer reactant mixture and combustion product gases in engines having a combustor. The method provided herein is useful in engines having one or more combustors in which the reactant mixture and product gases are subjected to acceleration directed transverse to a direction along which the reactant mixture flows through the combustors. Typically, the combustor rotates, wherein acceleration of the reactant mixture and product gases is centripetal and is naturally induced by the rotation of the combustor. In this regard, the method is especially suitable for rotating combustion systems including, but not limited to, rotary ramjet engines and wave rotor systems. However, it is to be appreciated that the method described herein is not limited to such systems, and that the method applies to any one or more combustors in which the reactant mixture and product gases are subjected to transverse acceleration as defined above. To these ends, the method includes the step of providing the engine having the combustor in which the reaction mixture and product gases are subjected to acceleration directed transverse to the direction along which the reactant mixture flows through the combustor during combustion.

An example of a combustor that includes the basic features of the instant invention is shown schematically at 12 in FIG.

1a. The method for improving interpenetration and associated mixing between the reactant mixture and product gases within the combustor, as described herein, also includes the step of positioning one or more catalyst elements 14 within the combustor 12 to generate Rayleigh-Taylor instability and thereby enhance interpenetration of the reactant mixture and product gases within the combustor 12 during combustion. Typically, the reactant mixture is continually interpenetrated with the product gases to obtain stable combustion.

Rayleigh-Taylor instability denotes instability of an interface between two fluids of different densities and occurs when the lighter fluid is accelerated into the heavier fluid. Instability of the interface results in formation of irregularities in the interface between the two fluids. Irregularities refer to any distortions of the interface into a shape other than a flat surface oriented perpendicular to the transverse direction Y in which the reactant mixture and product gases are subject to acceleration. As the lighter fluid is accelerated into the heavier fluid, any irregularities in the interface between the two fluids are magnified, as a result of the transverse acceleration, into interpenetrating Rayleigh-Taylor fingers, thereby creating so-called "fingering instabilities" of the lighter fluid into the heavier fluid. The fingering instabilities essentially represent penetration of the lighter gas into the volume of the heavier gas.

In any combustor 12, product gases are present along with the reactant mixture within the combustor 12 during combustion. The product gases are lighter than the reactant mixture, thereby corresponding respectively to the lighter and heavier gases that are exploited within the context of the instant invention for purposes of creating Rayleigh-Taylor instability as described above. One or more catalyst elements 14 are positioned within the combustor 12 as shown schematically in FIGS. 1a-1d so as to catalytically create product gases in the proximity of the catalyst elements 14. The catalyst elements 14 are generally strips of catalyst material positioned so that their longer dimension is oriented generally parallel (e.g., +/−10 degrees of parallel) to the streamwise direction Z along which the reactant mixture and product gases flow through the combustor 12. However, it is to be appreciated that the catalyst elements 14 may be present in forms other than strips, such as a series of catalyst particles arranged in a similar configuration to the strips.

Preferably, the one or more catalyst elements 14 are positioned on a radially outermost inner surface 64 of the combustor 12 that is perpendicular to the direction of the transverse acceleration, and are positioned so that the transverse acceleration acts to force the lighter product gases formed in the immediate proximity of the catalyst elements 14 to flow away from the catalyst elements 14 and the radially outmost inner surface 64. The transverse acceleration also acts to force the heavier reactant mixture to flow toward the catalyst elements 14 and the radially outmost inner surface 64 and into separations 15 between adjacent catalyst elements 14. Also preferably, when more than one catalyst elements 14 are positioned within the combustor 12, the catalyst elements 14 are positioned with lateral separations 15 between adjacent catalyst elements 14 along a lateral direction X that is generally perpendicular to the streamwise direction Z along which the reactant mixture and product gases flow through the combustor 12 during combustion and also generally perpendicular (e.g., +/−30 degrees, alternatively +/−10 degrees, of perpendicular) to the transverse direction Y along which the acceleration acts on the gases flowing through the combustor 12 during combustion. The separations between the catalyst elements 14 are generally regular separations and are described in further detail below. However, it is to be appreciated that the instant invention is not limited to the use of multiple catalyst elements 14, nor to the use of regular lateral separations 15. It is to be appreciated that the catalyst elements 14 may be placed anywhere in the combustor 12, so long as the positioning of the catalyst elements 14 acts to promote Rayleigh-Taylor instability within the combustor 12, though the benefits of the instant invention may then be generally lesser than might otherwise be achievable.

The catalyst elements 14 may be constructed from any catalyst material that serves to initiate the chemical conversion of the reactant mixture into product gases. The catalyst elements 14 serve to initiate the chemical reaction of the reactant mixture, but are not themselves consumed by the chemical conversion and thus remain present in the combustor 12 to provide continued benefits as described below. For reactant mixtures commonly used in combustors, suitable catalyst materials are well known in the art. For example, common catalysts include those containing metals such as, but not limited to, those selected from the group of nickel, platinum, palladium, and combinations thereof. It is to be appreciated that other catalyst materials, other than those containing metals, may also be used as known in the art. The selection of the catalyst material can thus be readily made once the reactant mixture is known for a given combustor.

For example, when the fuel is hydrogen and the oxidizer is oxygen, palladium-containing catalysts may be used. As another example, when the fuel is methane and the oxidizer is atmospheric air, nickel-containing catalysts may be used. Palladium-containing and nickel-containing catalysts are known in the art. It is to be appreciated that the instant invention is not limited to the use of any particular type of fuel or oxidizer, or any particular type of catalyst materials, and those of skill in the art are capable of identifying suitable catalyst materials based upon the particular reactant mixture used in the combustor.

As the reactant mixture flows over the catalyst element(s) 14 during operation of the combustors 12, a region 16 of product gases is generated in the immediate proximity of each catalyst element 14 as a result of the catalytic conversion of the reactant mixture into product gases. In this manner, the placement of the catalyst elements 14 in the combustor 12 creates a lateral pattern of irregularities 17 in the interface 18 between the product gases and the reactant mixture. This pattern of irregularities may be created in such a way that Rayleigh-Taylor instability induces amplification of the pattern to provide rapid interpenetration and associated mixing between the product gases and the reactant mixture within the combustor 12.

The lateral spacing 19, herein also denoted by "s" and measured by center-to-center distance between adjacent catalyst elements 14, defines a dominant wavelength, herein denoted by "$\lambda$", as $\lambda=s$. This dominant wavelength is ideally chosen to be sufficiently near the most-amplified Rayleigh-Taylor wavelength determined by the density $\rho_1$ of the reactant mixture, the density $\rho_2$ of the product gases, the transverse acceleration a acting on the reactant mixture and product gases within the combustor, and the thickness $\delta$ of the interface 18 between the higher-density reactant mixture and the lower-density product gases in the combustor. The thickness $\delta$ of the interface is equal to $\delta=[DT]^{1/2}$, where D is diffusivity of the reactant mixture into the product gases and T is the time that it takes for the reactant mixture to travel a length of the catalyst element. For any wavelength $\lambda$ that is substantially larger than the interface thickness $\delta$, the resulting Rayleigh-Taylor amplification rate $\beta$ is equal to $\beta=[2\pi Aa/\lambda]^{1/2}$, where $A=(\rho_1-\rho_2)/(\rho_1+\rho_2)$ is the dimensionless density difference ratio. The effect of the dominant wavelength $\lambda$ on the Rayleigh-Taylor amplification rate β is shown schematically in FIG. 1d. It can be seen in FIG. 1d that decreasing the dominant wavelength λ by reducing the lateral center-to-center spacing s of the catalyst elements 14 will lead to a larger Rayleigh-Taylor amplification rate β, which is desirable for achieving rapid interpenetration of the product gases into the reactant mixture.

The beneficial effect of reducing the lateral center-to-center spacing s described above remains effective until the corresponding dominant wavelength λ becomes of the same order of magnitude as the interface thickness δ. For wavelengths λ substantially shorter than δ, the effect of thermal and mass diffusion between the reactant mixture and product gases causes a decrease in the amplification rate β with continued reduction in the wavelength λ. This effect is also shown schematically in FIG. 1d. It is apparent in FIG. 1d that there is thus an optimal dominant wavelength λ, of the order of δ, at which the Rayleigh-Taylor amplification rate β will be maximized, and thus at which the interpenetration of the reactant mixture and product gases within the combustor will be greatest. For lateral center-to-center spacing 19 of the catalyst elements 14 near the wavelength λ at which the amplification rate β is maximized, the beneficial effects of the instant invention will be greatest. Consequently, the optimal lateral center-to-center spacing s between the catalyst elements 14 is from 0.5 to 1.5 times an interface thickness between the reactant mixture and the product gases during combustion at the location of the catalyst elements 14 in the combustor 12. In one specific embodiment, the lateral center-to-center spacing s between the catalyst elements 14 is approximately equal to the interface thickness δ at the location of the catalyst elements. Further preferably, the edge-to-edge spacing 15 of the catalyst elements 14 may be approximately equal to the width of the catalyst elements 14 along the lateral direction X (e.g., the separation may be equal to +/−5% of the width of the catalyst elements). However, it is to be appreciated that the instant invention is not limited to any particular separation distance, so long as the separation permits the Rayleigh-Taylor instability to occur within the combustor 12.

However, significant amplification rates β can be achieved with lateral center-to-center spacing s between the catalyst elements 14 corresponding to dominant wavelengths λ that are substantially different from this optimal value. In particular, it is to be noted in FIG. 1d that wavelengths longer than the optimal value are generally preferable than are those shorter than the optimal value, due to the manner in which the Rayleigh-Taylor amplification rate β varies with the wavelength λ. For purposes of the instant invention, any lateral center-to-center spacing s between the catalyst elements 14 will provide for the beneficial Rayleigh-Taylor amplification of the resulting lateral pattern of irregularities 17 in the interface 18 between the product gases and the reactant mixture, though the resulting amplification may not be as large as would result when the catalyst elements 14 are spaced based upon optimal lateral center-to-center spacing s noted above.

When the lateral center-to-center spacing s is approximately equal to the interface thickness δ, the resulting Rayleigh-Taylor amplification rate will be approximately $[2\pi Aa/\delta]^{1/2}$. When the lateral center-to-center spacing s is substantially larger than the interface thickness δ, the resulting Rayleigh-Taylor amplification rate will be approximately $[2\pi Aa/s]^{1/2}$. It is to be appreciated that spacing of the catalyst elements 14 is not strictly dictated based upon the creation of the maximum Rayleigh-Taylor amplification rate and effectiveness of interpenetration and mixing attributable to fingering instabilities, and the catalyst elements 14 may be placed in the combustor in any manner that results in creation of Rayleigh-Taylor instability.

In this manner, the catalyst elements 14 may be positioned within the combustor 12 so that the catalytically-driven proximal chemical conversion of the higher-density reactant mixture into the lower-density product gases will induce penetration via Rayleigh-Taylor instability of the product gases into the reactant mixture, and thereby essentially act to increase the area of the interface 18 between the reactant mixture and the product gases, as well as increase the interpenetration and associated mixing of product gases with the reactant mixture within the combustor 12. Such interpenetration of the product gases and the reactant mixture can thus be accomplished through exploitation of Rayleigh-Taylor instability, without the need for aerodynamic designs to promote interpenetration and associated mixing based on the interaction between the flow entering the combustor 12 and the detailed internal geometry of the combustor 12, or can be achieved in conjunction with such aerodynamic designs to attain more desirable combustor performance, including operation of such combustors over a wider range of conditions than would otherwise be practical as well as smaller, lighter, and less expensive combustors. Further, through exploitation of Rayleigh-Taylor instability, mixing may be accomplished for a broad range of operational fluid flow rates through the combustor 12, including fluid flow rates at idle operation of the combustor 12 and at maximized reactant mixture flow rate into the combustor 12.

As set forth above, any engine that operates with a combustor in which a transverse acceleration acts on a reactant mixture flowing through the combustor may benefit from the instant invention. More specifically, the Rayleigh-Taylor instability created by the presence of the catalyst elements 14 may be useful in engines that operate on the Brayton cycle. However, rotating combustion systems, such as rotary ramjet engines and wave rotor systems, may benefit most from the instant invention, since the transverse acceleration a that drives the Rayleigh-Taylor instability arises therein as a natural consequence of the rotating combustor motion. Moreover, in such rotating systems, the same acceleration created by the rotation can lead to centripetally-induced segregation of the reactant mixture and product gases, with the resulting reduced interpenetration between the reactant mixture and product gases in the combustor acting to reduce the combustion rate and thereby reduce the performance of the combustor 12. In some cases, this segregation can even prevent practical operation of such rotating combustion systems altogether. The increased mixing driven by the Rayleigh-Taylor instability on which the instant invention is based may be particularly beneficial for allowing certain types of such rotating combustion systems to operate satisfactorily.

Figure 2:
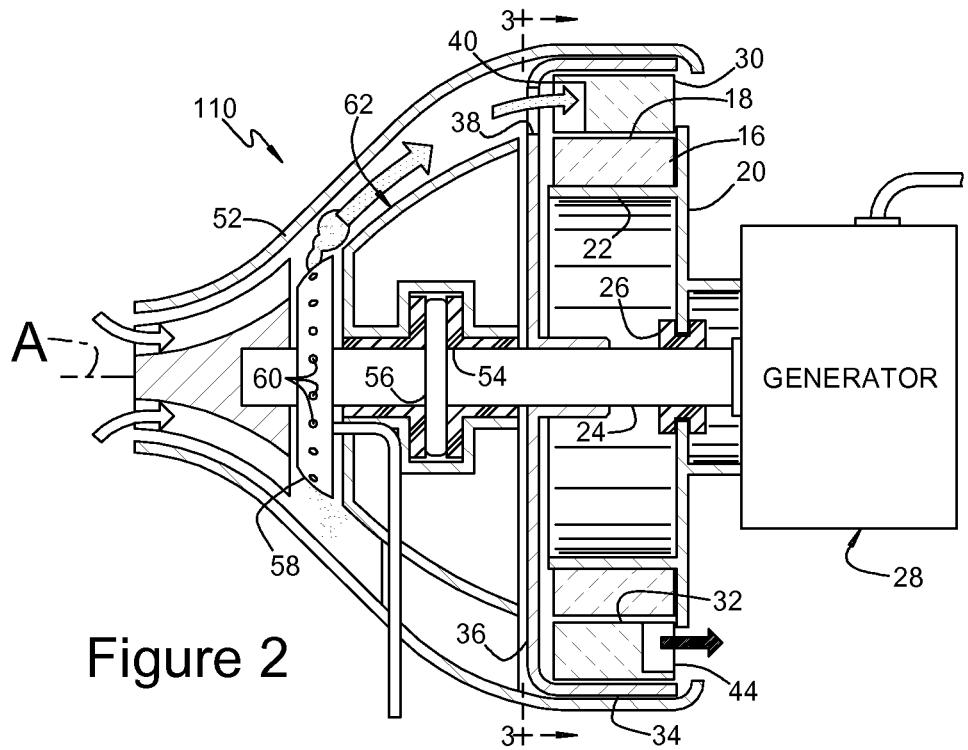
FIG. 2 is a simplified cross-sectional view of a rotary ramjet engine.
Figure 3:
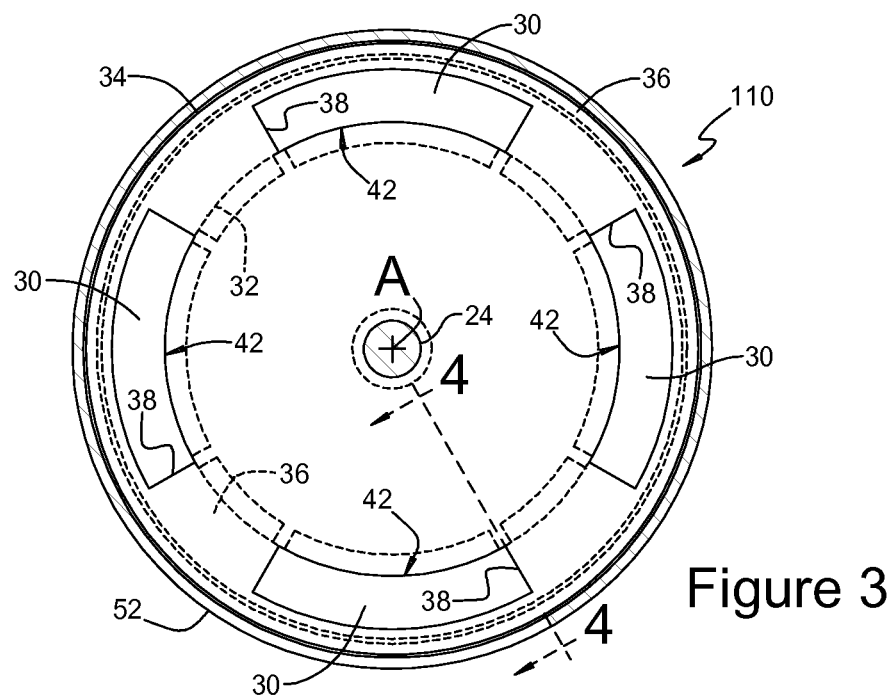
FIG. 3 is a front-elevation view of a rotor corresponding generally to a cross-section taken generally along lines 3-3 in FIG. 2.
Figure 4:
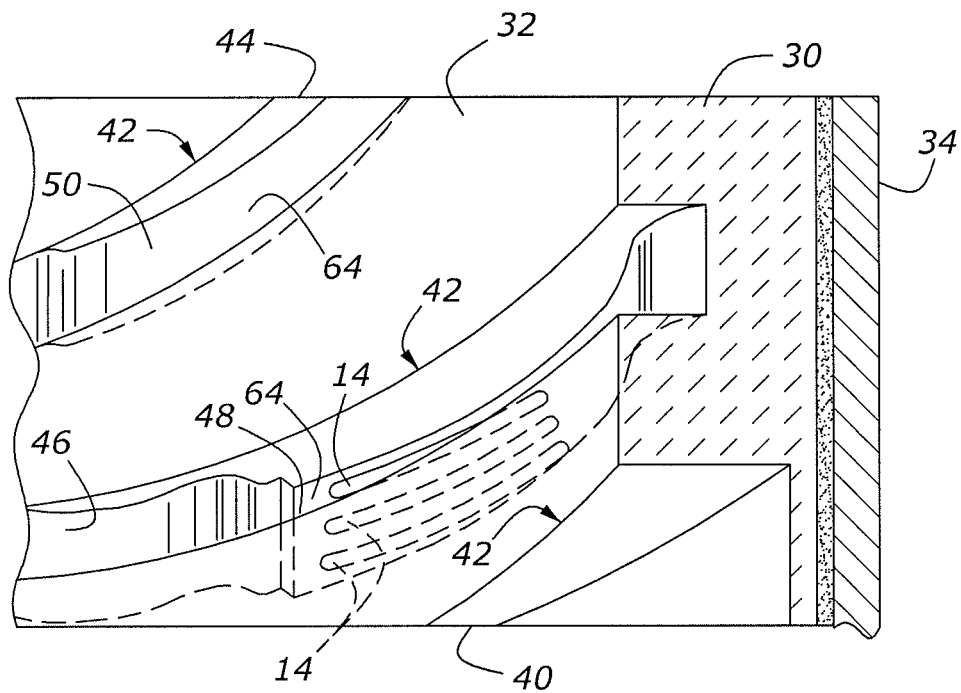
FIG. 4 is a fragmentary cross-sectional view taken generally along lines 4-4 in FIG. 3 to notionally illustrate the various contours within the flow channel which constitute diffuser, combustor and nozzle sections with catalyst elements positioned in the combustor section.
Figure 5:
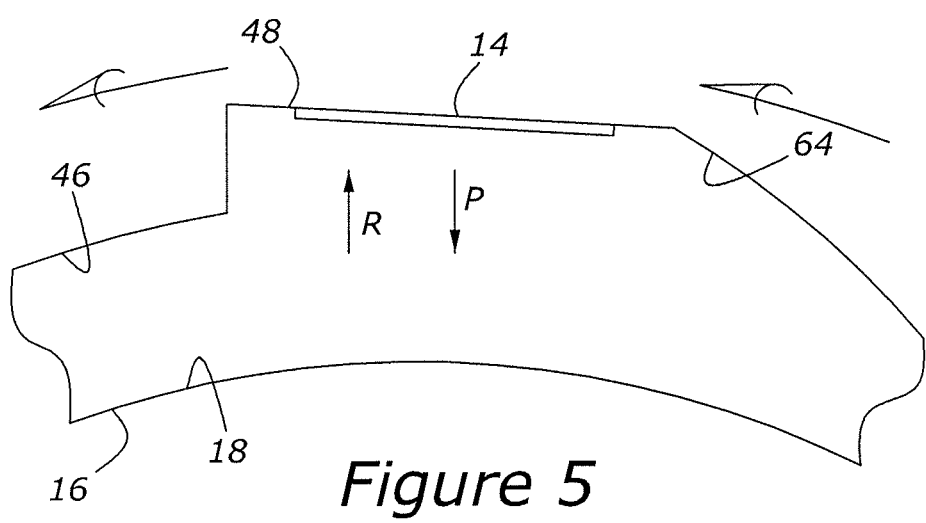
FIG. 5 is a schematic cross-sectional view of the combustor section in the rotor of FIG. 4 during combustion.
Figure 6:
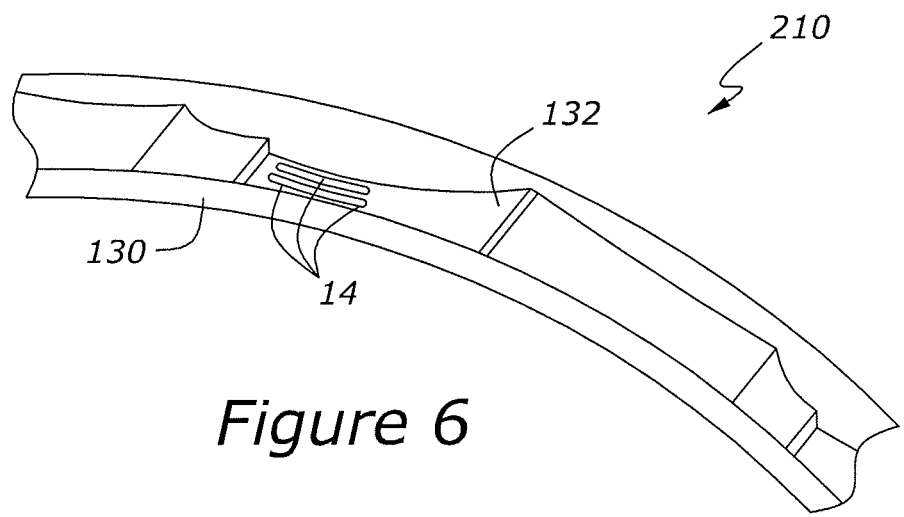
FIG. 6 is a fragmentary view of a rotor from another embodiment of a rotary ramjet engine with the rotor including various contours which constitute diffuser, combustor and nozzle sections, and with a catalyst positioned in the combustor section.

FIG. 2 generally illustrates one non-limiting type of rotary ramjet engine 110 that may benefit from the instant invention, and FIG. 3-5 illustrate specific features of the rotary ramjet engine 110 of FIG. 2 in further detail. The rotary ramjet engine 110 shown in FIGS. 2-5 is more specifically an inside-out rotary ramjet engine 110 and is described in detail in U.S. Pat. No. 7,685,824, the entirety of which is hereby incorporated by reference. FIG. 6 illustrates a portion of a conventional rotary ramjet engine 210 and is described in further detail below. The rotary ramjet engine 110 of FIG. 2 includes a stator 16 which has a generally annular, radially outward surface 18 centered about a central axis A. The stator 16 is generally stationary, but could be configured to rotate with or against a rotor 30. This outward surface 18 of the stator 16 may be generally cylindrical, or may be conically tapered or contoured in some fashion to provide optimal performance. As shown in FIG. 2, a frame 20 may include a generally radial back wall forming an axial backstop for the stator 16, and a cantilever annular support ledge 22 upon which the stator 16 is mounted.

A power shaft 24 is rotatably supported along the central axis A, and is journaled in the back wall of the stator frame 20 by a bearing 26 or a bushing or other rotary mount. The shaft 24 is shown in the Figures as a simple straight member, however it can take any known form including a stepped configuration and/or offset through the use of gears or other power transmission devices. In FIG. 2, the shaft 24 is shown operatively connected to a generator 28.

Referring again to FIG. 2, the engine 110 is shown further including the rotor 30 which is rotatably supported about the central axis A via a direct connection to the shaft 24. The rotor 30 is concentrically and axially aligned with the annular radially outward surface 18 of the stator 16 along the central axis A so that it can orbit about the central axis A positioned around the exterior of the surface during operation of the engine 110. The radially innermost surface 32 of the rotor 30 complements the annular radially outward surface 18 of the stator 16 so that a precise, close tolerance is maintained between the two components as the rotor 30 spins about the exterior of the stator 16. Thus, if the radially outward surface 18 is cylindrical, the radially innermost surface 32 of the rotor 30 is also cylindrical. By contrast, if the radially outward surface 18 were formed on a taper, the radially innermost surface 32 would be formed on a complementary taper, and so forth.

In order to establish the rigid connection between the rotor 30 and the power shaft 24, a spool 34 may be provided within which the rotor 30 is securely attached. The spool 34 is affixed to the outer circumference of the rotor 30 so that when the rotor 30 is in high speed rotary operation, centrifugal forces acting on the rotor 30 are transferred to the encircling structure of the spool 34. The spool 34 includes a centerfield 36 which joins fixedly to the shaft 24 by any suitable connection method, including press fit, keyed or splined fit, welding, mechanical fastening, or the like. Thus, the rotor 30 rotates together with the shaft 24 in this preferred embodiment. However, it will be appreciated that a gearing arrangement or other device could be interposed between the rotor 30 and shaft 24 so that a 1:1 ratio between their respective rotations is altered by some advantageous proportion.

The centerfield 36 includes arcuate windows 38 through which the reactant mixture is passed. Each window 38 corresponds with an inlet 40 to a flow channel 42, as shown at 42 in FIGS. 2 and 4, within the rotor 30. The window 38 for each flow channel 42 is aligned with the corresponding inlet 40 to provide a well-defined entrance to the flow channel 42. Each flow channel 42 extends helically from the respective inlet 40 to respective outlet 44 on the rearward side, i.e., opposite the centerfield 36. The flow channels 42 may be radially recessed into the rotor 30 from the innermost surface 32 of the rotor 30, and extend front to rear from an inlet 40 to an outlet 44. The rotor 30 defines the radially outermost inner surface 64 opposing the annular radially outward surface 18 of said stator 16. In this regard, the radially outermost inner surface 64 of the rotor 30 may define the flow channels 42. Preferably more than one flow channel 42 is used and the plurality of flow channels 42 are arranged as discrete, non-intersecting formations disposed in preferably equal circumferential increments about the central axis A.

Bounded by the close proximity of the radially innermost surface 32 of rotor 30 to the radially outward surface 18 of stator 16, each flow channel 42 creates a ramjet flow path in which are formed a diffuser section 46, a combustor section 48 that represents the "combustor" that is repeatedly referred to above, and a nozzle section 50 as shown in FIG. 4, with the various sections defined by contours in the flow channel. The one or more catalyst elements 14 are positioned in the combustor section 48 in the manner described above. Skilled persons in the art of ramjet flow path design know the general geometric features that define each of these sections, as well as the requirements for joining these sections into a proper ramjet flow path. According to well-known principles of ramjet engine construction, the various sections establish a varying-area ramjet duct geometry capable of providing near-isentropic gas dynamic compression, heat addition via combustion, and near-isentropic gas dynamic expansion to form a high-efficiency Brayton-cycle system. Thus, the reactant mixture entering through the inlet 40 encounters the ramjet flow channel 42 moving at a speed relative to the reactant mixture that is sufficiently above the speed of sound (Mach 1.0). The reactant mixture thus travels along the flow channel 42 and in so doing encounters a geometrical contour which functions as a supersonic diffuser that causes the fluid pressure to increase and the Mach number to decrease as the fluid progresses through the diffuser section 46.

Immediately following the diffuser section 46, the combustor section 48 is created by an appropriately-shaped geometrical configuration designed to provide flame stabilization for combustion of the reactant mixture occurring therein. The combustor section 48 may be any type capable of providing effective combustion of the reactant mixture, including for example a dump combustor, a bluff-body combustor, a vaned combustor, a catalytic combustor, or any other suitable combustor. The specific shape of the combustor section 48 may be designed to provide large-scale flame-vortex interactions that can assist in transporting the flame surface across the combustor section 48 on a time scale which is substantially faster than the nominal transit time of the working fluid through the combustor section 48.

The nozzle section 50 is shaped to provide near-isentropic expansion of the product gases entering from the combustion section to the exhaust pressure at the outlet 44 that produces net reaction thrust along the azimuthal direction as the product gases exit through the outlets 44. This creates a net torque, consisting of the torque produced by thrust from the flow channels 42, the opposing torque produced by friction with the air on the surfaces of the centerfield 36, spool 34, and rotor 30, and any torques produced by mechanical friction or other sources. The resulting net torque balances the electromagnetically-induced resistive torque produced by the generator 28 (or other component driven by the shaft 24) to produce a resulting steady-state rotation rate.

In the embodiment shown in FIG. 4, the radially outermost inner surface 64 of the rotor 30 defines the contours within the flow channels 42 that form the diffuser section 46, the combustor section 48, and the nozzle section 50.

Referring again to FIG. 2, the engine 110 is shown including a protective housing 52, which preferably surrounds the rotor 30 to encapsulate the rotating components and also provides beneficial air handling characteristics. The housing 52, which can take many different forms and is not limited to the inverted funnel shape depicted, is provided with an upstream air intake and an open exhaust end. The housing 52 is preferably fixed relative to the stator 16 and the stator frame 20 and may be connected directly thereto. The housing 52 may also be supported on the rotating shaft 24 through a bearing arrangement 54 which includes both radial and thrust components. Thus, the shaft 24 may be provided with a flange 56 which is captured within the bearing arrangement 54 to help stabilize the housing 52 to provide an axial reaction mechanism vis-à-vis thrust forces produced by the combustion process within the rotor 30. Of course, other configurations and arrangements of components can be designed to address the need for a thrust bearing within the construction to accommodate axial reaction forces produced by combustion processes within the rotor 30.

As alluded to above, FIG. 6 illustrates a portion of a conventional rotary ramjet engine 210 as an alternative to the rotary ramjet engine 110 shown in FIG. 2 and described above. For the conventional rotary ramjet engine 210 of FIG. 6, the relative positions of a stator 116 and rotor 130 therein are opposite from the relative position of the rotor 30 and stator 16 in FIG. 2. More specifically, the rotor 130 is disposed concentrically and axially aligned with a radially internal surface 118 of the stator 116 such that the rotor 130 rotates within the stator 116, as opposed to rotating around the stator 16 as is the case with the rotary ramjet engine 110 of FIG. 2. In the embodiment of FIG. 6, the contours that create the ramjet flow path for the rotor 130 are formed on the radially outward surface 132 of the rotor 130, as opposed to the contours being formed on the radially innermost surface for the rotor 30 as shown in FIG. 4.

At some point, fuel must be mixed with the oxidizer to provide the reactant mixture. This can be accomplished in a variety of ways, depending in part on the nature of the fuel supplied to the engine. The fuel could be any fuel or mixture of fuels capable of combustion with the oxidizer in the combustor, including gaseous fuels, liquid fuels, or even sufficiently fine particulates of solid fuels. In the exemplary embodiment depicted in FIG. 2, liquid fuel is atomized by a fuel slinger 58 which is operatively coupled to the shaft 24 immediately upstream of a spacer 62. The fuel slinger 58 can, itself, take many forms, but in the illustrated embodiment is a rotary centrifugal atomizer comprising a cup-like structure having holes 60 or a serrated edge to break the liquid fuel into tiny droplets under the centripetal force created by high speed rotation with the shaft.

As an alternative to the fuel slinger, the fuel could be introduced directly into the flow channels, and especially in or just upstream of the combustor. As a further alternative example, the fuel in either gaseous form, in atomized droplet form, or in fine solid particulate form can be mixed with the incoming oxidizer to provide the reactant mixture prior to being caused to enter through the intake of the housing 52. The oxidizer passing around the outer surface of the spacer 62 is thus mixed with the fuel to provide the reactant mixture, which is then introduced into the flow channels.

Figure 7:
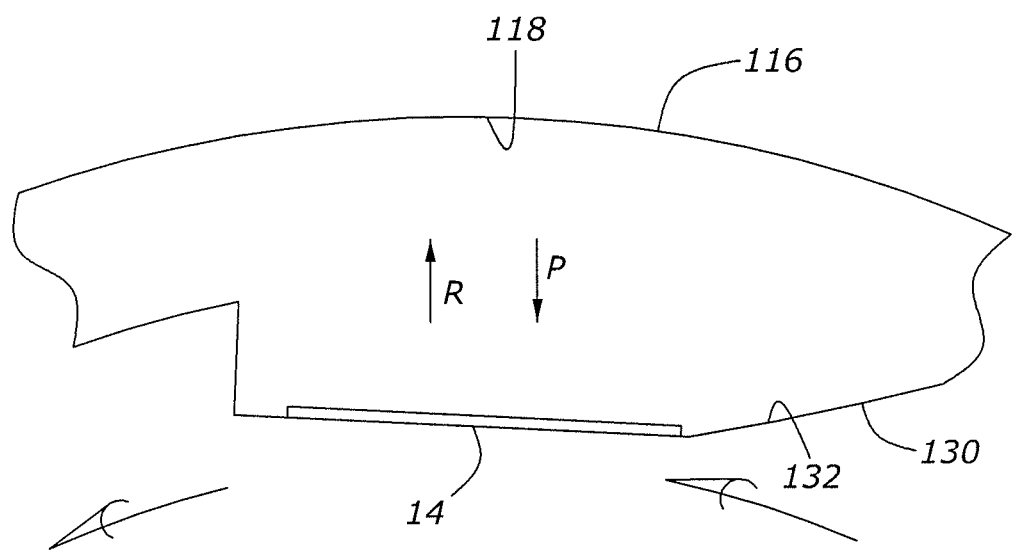
FIG. 7 is a schematic cross-sectional view of the combustor section in the rotor of FIG. 6 during combustion.

Segregation of product gases and the reactant mixture is particularly prevalent within rotary ramjet engines due to the effect of centripetal acceleration of the reactant mixture and product gases during operation of the rotary ramjet engines. During operation of the rotary ramjet engines, as the reactant mixture enters a flow channel, the diffuser of the flow channel produces Mach waves that accelerate the reactant mixture along the flow channel until the reactant mixture is moving at nearly the same velocity as the flow channel. Thus, because the flow channel is rotating along with the rotor, any fluid in the flow channel also rotates such that the fluid is subject to the centripetal acceleration referred to above. As set forth above, the product gases are lighter than the reactant mixture. When the product gases are present with the reactant mixture within the flow channel, the centripetal acceleration causes the higher-density reactant mixture to localize further from the axis of rotation A, thereby displacing the lower-density product gases, which localize closer to the axis of rotation A. FIGS. 5 and 7 illustrate relative movement of the product gases (as indicated with the arrow labeled "P") and the reactant mixture (as indicated with the arrow labeled "R"), when subject to centripetal acceleration, for the two respective embodiments of the rotary ramjet engines 110, 210 of FIGS. 2 and 6.

As described above, Rayleigh-Taylor instability is created in the combustor due to placement of the catalyst elements 14 therein. The Rayleigh-Taylor instability is especially useful to promote interpenetration and associated mixing of gases in the rotary ramjet engines due to the segregation of product gases and the reactant mixture attributable to the centripetal acceleration of the reactant mixture and product gases. However, as set forth above, Rayleigh-Taylor instability may be exploited to promote interpenetration in any engine that operates on the continuous internal combustion principle where the reaction mixture and product gases are subjected to transverse acceleration as described above.

Typically, as set forth above, the one or more catalyst elements 14 may be placed in the combustor 12 in the form of strips oriented generally in the direction along which the reactant mixture flows into the combustor 12. Most typically, several catalyst elements 14 are positioned within the combustor 12. In the context of the rotary ramjet engine 110 shown in FIGS. 4 and 5, the one or more catalyst elements 14 may be positioned on one or more walls of the combustor section 48 defined by the rotor 30. In one embodiment, the one or more catalyst elements 14 are positioned on the radially outermost inner surface 64 of the rotor 30 in the combustor section 48 (i.e., the combustor). Dimensions of the catalyst elements 14, as well as spacing between the catalyst elements 14, are preferably determined to achieve the maximum Rayleigh-Taylor amplification rate as described herein. In this manner, during combustion, a fingering instability may be created adjacent to the catalyst elements 14, and the fingering instabilities created by the catalyst elements 14 extend into the reactant mixture to thereby break down the boundary between the reactant mixture and the product gases. The size and spacing of the catalyst elements 14 can be optimized to maximize creation of the fingering instabilities and effectiveness of mixing attributable to the fingering instabilities through fundamentals of Rayleigh-Taylor instability, as described in detail above.

To illustrate placement of catalyst elements 14 within a combustor to create Rayleigh-Taylor instability, the Applicants provide the following example, which is intended to supplement, and not to limit, the above description of the invention.

EXAMPLE

An inside-out rotary ramjet engine is provided, as described above and as shown in FIG. 2. The rotary ramjet engine includes a combustor that defines a radially innermost surface of a rotor. The rotor rotates at an optimal rate (for purposes of the instant Example) of $\Omega=10,000$ revolutions per minute (rpm) at a radius $R=10$ centimeters (cm) around a central axis. The combustor thus moves at a speed $(2\pi R)(\Omega/60)=104.7$ meters per second (m/s). A methane and air reactant mixture is introduced into the combustor at a flow speed of 50 m/s relative to the stator, and thus the reactant mixture is moving through the rotating combustor at the combined speed of $U=104.7$ m/s+50 m/s=154.7 m/s relative to the combustor. Consequently, the reactant mixture is subjected to a centripetal acceleration $a=U^2/R=239,000$ m/s$^2$ as it flows through the combustor. This centripetal acceleration is directed along the radial direction relative to the central axis, and thus is transverse to the direction along which the reactant mixture flows through the combustor. Nickel-containing catalyst elements in the form of strips each measuring 5 mm in length are placed along the radially innermost surface of the rotor, and each catalyst element is oriented so that its long dimension is aligned with the direction along which the reactant mixture flows through the combustor. A number of such catalyst elements in the form of strips are spaced at equal intervals along the lateral direction X across the width of the combustor. The width of these catalyst elements and the center-to-center lateral spacing of the catalyst elements are determined as described below so as to provide for large Rayleigh-Taylor interpenetration of the product gases into the reactant mixture.

Continuing with the Example, as the reactant mixture first contacts any one of these catalyst elements, product gases begin to be generated via catalytically-initiated combustion near the surface of the catalyst element, leading to an initially small region of product gases above the catalyst element. As the reactant mixture continues to flow along the catalyst element, additional product gases are generated as reactants and heat diffuse across the interface between the reactant mixture and the product gases. Specifically, as reactants diffuse toward the catalyst element, they react in the presence of the catalyst or by thermal initiation of reaction due to the high-temperature of the small region of product gases above the catalyst element. Similarly, as product gases diffuse outward from the catalyst they contribute to radical-induced and thermal-induced initiation of reactions in the reactant mixture. If the reactant mixture is taken to be flowing at the nominal speed of U=154.7 m/s downstream along the catalyst element, then it reaches the end of the 5 mm long catalyst element after a nominal time T=0.005 m/154.7 m/s=32 μsec. During this time, thermal diffusion of heat and mass diffusion of reactants in the reactant mixture and product gases across the interface at a nominal diffusivity of D=3.6 $(10^{-5})$ $m^2/s$ will produce a nominal diffusion layer thickness $\delta=[DT]^{1/2}$=34 μm. The arrangement of the lower-density product gases within the combustor causes them to push against the higher-density reactant mixture due to the a=239,000 $m/s^2$ centripetal acceleration acting on the gases in the combustor. This produces Rayleigh-Taylor amplification of any irregularities in the interface between the reactant mixture and the product gases. The spacing of the catalyst elements at a lateral center-to-center spacing s along the lateral direction X on the combustor wall creates a set of regularly-spaced regions of product gases, with one such region above each catalyst element as described above, which in turn imposes a dominant wavelength λ in the resulting transverse irregularities of the interface. As described above, the maximum Rayleigh-Taylor amplification will occur when this dominant wavelength λ is approximately equal to the nominal diffusion layer thickness δ. Thus, based on the above example, if the catalyst elements are placed on a center-to-center spacing s of approximately 34 μm, and have a width nominally half this separation, and therefore a width of approximately 17 μm and a separation of approximately 17 μm, then the initial Rayleigh-Taylor amplification of these irregularities will be approximately equal to the maximum achievable amplification rate, and thus the initial interpenetration of product gases into the reactant mixture and thereby the initial growth rate of the interfacial area available for thermal and mass interdiffusion across this interface as required to sustain combustion of the reactant mixture within the combustor will also be maximized.

However, if for various practical reasons the catalyst elements can only be made as narrow as 1 mm, and therefore preferably placed on lateral center-to-center spacing s=2 mm, then the Rayleigh-Taylor amplification rate of the resulting λ=2 mm initial irregularities in the interface will only be a factor of (2 mm/34 μm)$^{1/2}$=7.6 times smaller than would be the case for the ideal λ=34 μm catalyst spacing noted above. Thus these larger (5 mm long by 1 mm wide) catalyst elements placed at 2 mm center-to-center spacing along the lateral direction X and thus having 1 mm separation between adjacent catalyst elements on the radially outermost inner surface of the rotating combustor would still produce a Rayleigh-Taylor amplification rate within an order of magnitude of the ideal maximized value.

The foregoing Example shows the importance of the arrangement of catalyst elements within the combustor to promote Rayleigh-Taylor instability between the reactant mixture and the product gases, and it is clear that the precise dimensions of the catalyst elements and their precise spacing are of only secondary importance for achieving the beneficial increased interpenetration of the reactant mixture and product gases that is the object of the instant invention. Those making use of the instant invention thus have considerable ability to adapt the dimensions of the catalyst elements and their spacing to allow the essential benefit of the invention to be obtained in their particular combustor application.

Obviously, many modifications and variations of the present invention are possible in light of the above teachings, and the invention may be practiced otherwise than as specifically described within the scope of the appended claims. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A method for improving interpenetration, mixing, and combustion between a fuel and oxidizer reactant mixture and combustion product gases in engines having a combustor, said method comprising the steps of:
providing an engine having an annular combustor that extends axially in which the reaction mixture and product gases are subjected to acceleration directed transverse to a direction along which the reactant mixture flows through the combustor during combustion;
positioning a plurality of catalyst elements defined as catalyst material having a longer dimension oriented generally parallel to a streamwise direction along which the reactant mixture and product gases flow through the combustor and on a radially outermost inner surface of the combustor that is perpendicular to the direction of the transverse acceleration to generate Rayleigh-Taylor instability and thereby enhance interpenetration of the reactant mixture and product gases within the combustor chamber during combustion; and
wherein the catalyst elements are positioned in the combustor and arranged circumferentially around the combustor with circumferential separations between two adjacent of the catalyst elements along a lateral direction that is perpendicular to the transverse direction along which the acceleration acts on the gases flowing through the combustor during combustion.

2. A method as set forth in claim 1 in which the combustor rotates, wherein acceleration of the reactant mixture and product gases is centripetal and is naturally induced by the rotation of the combustor.

3. A method as set forth in claim 1 wherein an edge-to-edge spacing between the catalyst elements is approximately equal to a width of the catalyst elements along the lateral direction.

4. A method as set forth in claim 1 wherein a center-to-center spacing between the catalyst elements is from 0.5 to 1.5 times an interface thickness between the reactant mixture and the product gases during combustion at the location of the catalyst elements in the combustor.

5. A method as set forth in claim 2 wherein the engine is further defined as a rotating combustion system.

6. An engine comprising:
an annular combustor that extends axially in which a fuel and oxidizer reactant mixture and combustion product gases are subjected to acceleration directed transverse to a direction along which the reactant mixture flows through said combustor during combustion;
a plurality of catalyst elements defined as catalyst material having a longer dimension oriented generally parallel to a streamwise direction along which the reactant mixture and product gases flow through said combustor and on a radially outermost inner surface of said combustor that is perpendicular to the direction of the transverse acceleration to generate Rayleigh-Taylor instability between the product gases and the reactant mixture present in said combustor during combustion to thereby enhance interpenetration of the reactant mixture and product gases within the combustor chamber; and
wherein said catalyst elements are positioned in said combustor and arranged circumferentially around said combustor with circumferential separations between two adjacent of said catalyst elements along a lateral direction that is perpendicular to the transverse direction along which the acceleration acts on the gases flowing through said combustor during combustion.

7. An engine as set forth in claim 6 in which said combustor rotates, wherein acceleration of the reactant mixture and product gases is centripetal and is naturally induced by the rotation of said combustor.

8. An engine as set forth in claim 6 wherein an edge-to-edge spacing between said catalyst elements is approximately equal to a width of said catalyst elements along the lateral direction.

9. An engine as set forth in claim 6 wherein a center-to-center spacing between said catalyst elements is from 0.5 to 1.5 times an interface thickness between the reactant mixture and the product gases during combustion at the location of said catalyst elements in said combustor.

10. An engine as set forth in claim 6 wherein the catalyst contains a metal selected from the group of nickel, platinum, palladium, and combinations thereof.

11. An engine as set forth in claim 6 further defined as a rotating combustion system.

12. An engine as set forth in claim 11 wherein the engine is a Brayton-cycle rotary ramjet engine comprising:
a stator having a generally annular radially outward surface centered about a central axis; and
a rotor rotatably supported about said central axis and concentrically and axially aligned with said annular radially outward surface of said stator along said central axis, said rotor including a radially innermost surface complementing said annular radially outward surface of said stator and defining at least one helically extending ramjet flow channel radially recessed into said rotor from said radially innermost surface of said rotor, said at least one helically extending ramjet flow channel including an axially forward inlet and an axially rearward outlet, wherein each flow channel creates a ramjet flow path in which are formed a diffuser section, a combustor section representing said combustor, and a nozzle section, with the sections defined by contours in the flow channel,
wherein said catalyst elements are positioned on one or more walls of said combustor section.

13. An engine as set forth in claim 12 wherein a radially outermost inner surface of said rotor defines said contours within the flow channel that form said diffuser section, said combustor section, and said nozzle section, with said radially outermost inner surface opposing said annular radially outward surface of said stator.

14. An engine as set forth in claim 13 wherein said catalyst elements are positioned on said radially outermost inner surface of said rotor.

* * * * *